United States Patent
Davidovici et al.

[19]

[11] Patent Number: 6,041,073

[45] Date of Patent: Mar. 21, 2000

[54] MULTI-CLOCK MATCHED FILTER FOR RECEIVING SIGNALS WITH MULTIPATH

[75] Inventors: Sorin Davidovici, Oceanpoint; Jimmy Cuong Tran, Jackson; Emmanuel Kanterakis, North Brunswick, all of N.J.

[73] Assignee: Golden Bridge Technology, Inc., West Long Branch, N.J.

[21] Appl. No.: 09/157,300

[22] Filed: Sep. 18, 1998

[51] Int. Cl.[7] ...................................................... H04B 1/69
[52] U.S. Cl. .......................... 375/148; 375/149; 375/152; 370/335; 370/342; 370/441
[58] Field of Search ..................................... 375/200, 206, 375/208, 343, 347; 370/320, 335, 342, 441

[56] References Cited

U.S. PATENT DOCUMENTS

| | | | |
|---|---|---|---|
| 5,528,624 | 6/1996 | Kaku et al. | 375/206 |
| 5,548,613 | 8/1996 | Kaku et al. | 375/208 |
| 5,802,102 | 9/1998 | Davidovici | 375/207 |
| 5,809,062 | 9/1998 | Hulbert | 375/206 |

*Primary Examiner*—Don N. Vo
*Attorney, Agent, or Firm*—David Newman Chartered

[57] ABSTRACT

A multi-clock matched filter for receiving signals with multipath. The signals may be modulated with a spread-spectrum spreading sequence, or other analog or digital signal. A number of signal registers store digital samples of the received signal. The gating of digital samples into each of the signal registers is controlled by a separate clock timing. The timing sequence may be derived from a common clock. A multiplexer sequentially selects each of the signal registers, and passes the respective content of each signal register to a matched filter. A number of delay-locked-loop circuits track each of the multipath signals, and generate the timing sequence for gating signal registers.

12 Claims, 2 Drawing Sheets

MULTI-CLOCK MATCHED FILTER FOR RECEIVING SIGNALS WITH MULTIPATH

BACKGROUND OF THE INVENTION

This invention relates to communications, and more particularly to receiving signals in a multipath environment.

DESCRIPTION OF THE RELEVANT ART

Communications, using radiowaves, may encounter reflections from more than one object or from multiple surfaces. The length of each path for the radio waves can be different, which gives rise to radio waves from the different paths arriving at different times. Radiowaves for one signal arriving at different times at a receiver is well known as multipath. Each path of the radio waves in a multipath environment is a ray.

A typical approach to receiving a signal with multipath is RAKE. A RAKE system usually locks onto a strongest ray from the multipath, and simultaneously searches for a next strongest ray to replace the ray which is initially acquired. While a RAKE system may include a matched filter, the RAKE system typically has one clock and does not combine the various multipath signals.

SUMMARY OF THE INVENTION

A general object of the invention is to combine multiple rays arriving at a receiver due to multipath.

Another object of the invention is to employ a matched filter, having a clock system for receiving multiple rays.

An additional object of the invention is to maximally ratio combine multiple rays from multipath.

According to the present invention, as embodied and broadly described herein, an improvement to a spread-spectrum receiver is provided for receiving, from a multi-path environment, a spread-spectrum signal. The spread-spectrum signal has data spread by a chip-sequence signal. Each chip of the chip-sequence signal has a chip duration. The spread-spectrum signal arrives from a plurality of paths in the multipath environment.

The improvement includes a clock-signal generator, an analog-to-digital converter, a plurality of signal registers, a plurality of gates, a signal-register multiplexer, a matched filter, a RAKE-timing generator, a plurality of delay-locked-loop (DLL) path-tracking circuits, and a plurality of DLL multiplexers. The clock-signal generator generates a clock signal. The clock signal has a plurality of phases during the chip duration.

The analog-to-digital converter samples the spread-spectrum signal to generate a plurality of chip samples. The analog-to-digital converter converts each chip sample to a digital-chip sample. The plurality of signal registers store a plurality of digital-chip samples. A particular gate, of the plurality of gates, passes a respective number of the plurality of digital-chip samples into a respective signal register, of the plurality of signal registers, in response to a particular set of phase signals. The signal-register multiplexer selects a respective signal register from the plurality of signal registers.

The matched filter has an impulse response matched to the spread-spectrum signal. The matched filter detects an early portion, a punctual portion, and a late portion of each chip embedded in the spread-spectrum signal, for each detected path of the plurality of paths. In response to a respective path-select signal of the plurality of path-select signals, the plurality of DLL path-tracking circuits gate the early portion and the late portion, corresponding to a respective path, of each detected spread-spectrum signal, into the DLL path-tracking circuit. The DLL path-tracking circuit generates a DLL signal of a plurality of DLL signals. The RAKE-timing generator generates a plurality of path-select signals. The path-select signals correspond to the plurality of paths from the multipath environment. In response to a respective DLL signal from a respective DLL path-tracking circuit, each of the plurality of DLL multiplexers passes a respective set of phases of the plurality of phases from the clock-signal generator to a respective gate of the plurality of gates.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWING

The accompanying drawing, which is incorporated in and constitutes a part of the specification, illustrates preferred of the invention, and together with the description serves to explain the principles of the invention.

DETAILED DESCRIPTION OF THE PREFERRED EMBODIMENTS

Figure 1:
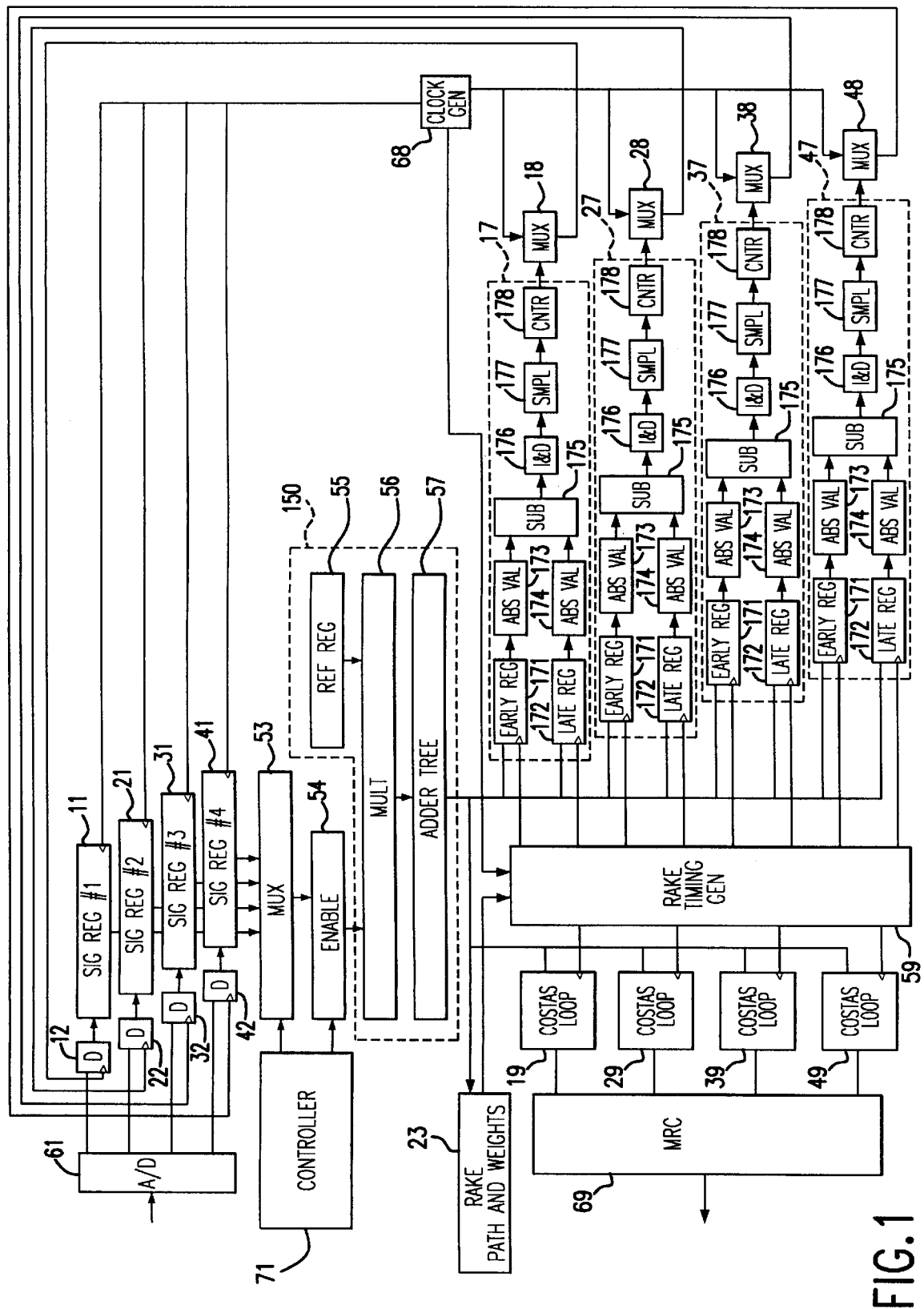
FIG. 1 is a block diagram of a multi-clock matched filter system.

Reference now is made in detail to the present preferred embodiments of the invention, examples of which are illustrated in the accompanying drawings, wherein like reference numerals indicate like elements throughout the several views.

The present invention provides a new and novel improvement to a spread-spectrum receiver for receiving and combining rays arriving from a multipath environment. In a preferred embodiment, the spread-spectrum receiver receives a spread-spectrum signal from a multipath environment. The spread-spectrum signal has data spread by a chip-sequence signal. Each chip of the chip-sequence signal has a chip duration. The spread-spectrum signal arrives from a plurality of paths from a multipath environment. The present invention may be extended to non-spread-spectrum signals, for receiving digital signals in a multipath environment.

The improvement includes clock-signal means, converter means, register means, gate means, signal-multiplexer means, matched-filter means, RAKE generator means, delay-locked-loop (DLL) means, and DLL-multiplexer means. The gate means is coupled between the register means and the converter means. The signal-multiplexer means is coupled to the register means. The matched-filter means is coupled to the signal-multiplexer means. The DLL-multiplexer means is coupled to the RAKE generator means, to the DLL means, and to the gate means.

The clock-signal means generates a clock signal. The clock slgnal, during a chip duration, has a plurality of phases. The number of phases of the plurality of phases is at least equal to a number of paths of the plurality of paths. The number of paths corresponds to the number of arrivals in time of a chip, which is being detected from the multipath environment.

The converter means samples the spread-spectrum signal to generate, during the chip duration, a plurality of chip samples. The number of chip samples in the plurality of chip samples is at least equal to the number of phases in the plurality of phases. The converter means samples an incoming spread-spectrum signal, such that sufficient chip samples are present for detecting, and distinguishing, the desired paths from the plurality of paths. The converter means converts each chip sample, of the plurality of chip samples, to a digital-chip sample.

The register means, which preferably includes a plurality of signal registers, stores a plurality of digital-chip samples in each of the signal registers. More particularly, in response to a particular set of phases, the gate means passes a respective number of the plurality of digital-chip samples into a respective signal register of the plurality of the register means. The particular set of phases is from a multiplicity of sets of phases. A particular set of phases for controlling the passing of a particular plurality of digital-chip samples into a particular signal register, is different from a set of phases for controlling the passing of a different plurality of digital-chip samples into a different signal register. Each plurality of digital-chip samples stored in a particular signal register corresponds to chips arriving from a particular path of the multipath environment.

The signal-multiplexer means selects a respective signal register from the register means, in response to a register-select signal.

The matched-filter means has an impulse response matched to the spread-spectrum signal. The matched-filter means detects an early portion, a punctual portion, and a late portion of each chip embedded in the spread-spectrum signal, for each path of the plurality of paths, respectively. The chips corresponding to each path are selected by the signal-multiplexer means. The digital-chip samples are passed through the signal-register means to the matched-filter means.

The RAKE generator means generates a plurality of path-select signals. Each path-select signal, from the plurality of path-select signals, corresponds to each path from the plurality of paths of the multipath environment, respectively.

In response to a respective path-select signal, from the plurality of path-select signals, the DLL means gates the early portion and the late portion, corresponding to a respective path, of the detected spread-spectrum signal, into the DLL means. The DLL means, using the early and late portions, generates a DLL signal of the plurality of DLL signals.

As an option, the early portion of a chip may be the same as the late portion of a previous chip. Conversely, the late portion of a chip may be the early portion of a successive chip. Thus, only one chip sample is required for the early portion and the late portion.

The DLL multiplexer means passes a respective set of phases of the plurality of sets of phases from the clock-signal means to the gate means, in response to a respective DLL signal from a respective DLL means. The DLL multiplexer means thereby generates a multiplicity of sets of phase signals.

As illustratively shown in FIG. 1, the clock-signal means may be embodied as a clock-signal generator 68, the converter means may be embodied as an analog-to-digital converter 61, and the register means may be embodied as a plurality of signal registers 11, 21, 31, 41. The gate means may be embodied as a plurality of gates 12, 22, 32, 42, the signal-multiplexer means may be embodied as a signal-register multiplexer 53, and the matched-filter means may be embodied as a matched filter 150. The RAKE generator means is embodied as a RAKE-timing generator 59, the DLL means is embodied as a plurality of delay-locked-loop (DLL) path-tracking circuits 17, 27, 37, 47, and the DLL multiplexer means is embodied as a plurality of DLL multiplexers 18, 28, 38, 48.

The plurality of gates 12, 22, 32, 42 is coupled between the plurality of signal registers 11, 21, 31, 41, respectively, and the analog-to-digital converter 61. The signal-register multiplexer 53 is coupled to each of the plurality of signal registers 11, 21, 31, 41. The matched filter 150 is coupled to the signal-register multiplexer 53. The plurality of DLL path-tracking circuits 17, 27, 37, 47 is coupled to the matched filter 150. The plurality of DLL multiplexers 18, 28, 38, 48 is coupled to the clock signal generator 68, to the plurality of DLL path-tracking circuits 17, 27, 37, 47, respectively, and to the plurality of gates 12, 22, 32, 42, respectively. An enable circuit 54 is coupled between the signal-register multiplexer 53 and the matched filter 150. A controller 71 is coupled to the signal-register multiplexer 53 and to the enable circuit 54. The controller 71 generates control signals for the signal register multiplexer 53 and the enable circuit 54.

The clock-signal generator 68 generates a clock signal. During a chip duration, the clock signal has a plurality of phases. The number of phases of the plurality of phases is at least equal to the number of paths, being detected, of the plurality of paths. Assume the number N represents the number o phases in the plurality of phases. The clock-signal generator 68 would have N outputs, with each output having the clock signal at the clock rate, but with a different phase. Thus, the N phase clock has N waveforms at the same clock rate, with N leading edges displaced in time by 1/N chip duration. The leading edge of each output, however, would be delayed by 1/N phases from each other. The number N of phases may be larger than the number of paths in the multipath.

The analog-to-digital converter 61 samples the spread-spectrum signal, at N times the clock rate of the clock-signal generator. Thus, for one clock cycle, the analog-to-digital converter 61 produces N chip samples. During the chip duration, the analog-to-digital converter 61 generates a plurality of chip samples. The number of chip samples in the plurality of chip samples is at least equal to the number of phases in the plurality of phases. The analog-to-digital converter 61 converts each chip sample, of the plurality of chip samples, to a digital-chip sample. The analog-to-digital converter 61 thereby generates a plurality of digital-chip samples.

The plurality of gates 12, 22, 32, 42 passes a respective number of the plurality of digital-chip samples into a respective signal register of the plurality of signal registers 11, 21, 31, 41, in response to a set of phase signals, respectively, from a multiplicity of sets of phase signals.

Figure 2:
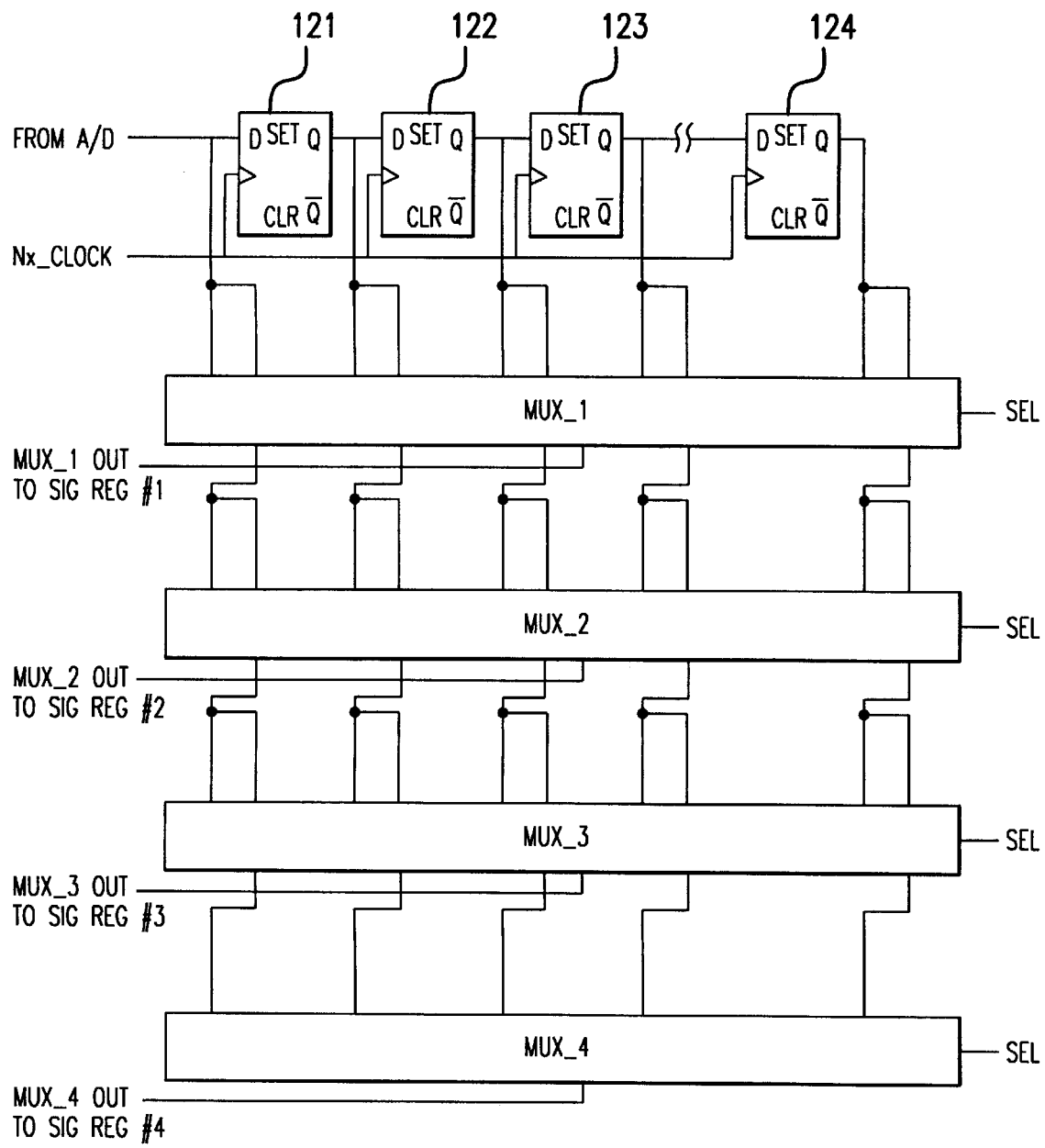
FIG. 2 is a block diagram of an alternative embodiment for a gate.

Each gate of the gate means alternatively may be embodied as shown in FIG. 2. In FIG. 2, a particular gate, for example gate 12, might include the plurality of registers and the plurality of multiplexers. Referring to FIG. 2, the analog-to-digital converter 61 samples at N times the chip rate, and in FIG. 2, a number of registers delays the samples from the analog-to-digital converter. In this case, the plurality of registers 121, 122, 123, 124 are connected so that the samples shift through the registers. The registers serve as N-stage delay or shift register, which may be one bit or many bits wide, as is well known in the art. A particular gate multiplexer selects a different sampling point in time for the multipath. Thus, a first gate multiplexer MUX1, a second gate multiplexer MUX2, a third gate multiplexer MUX3, and a fourth gate multiplexer MUX4, may select the sampling point for a given point in the multipath. This allows each register to track a multipath. Using the embodiment shown in FIG. 2, gate 12, gate 22, gate 32 and gate 42 of FIG. 1 easily may be adapted for any signal path by simply changing the timings on the multiplexers MUX1, MUX2, MUX3, and MUX4, respectively.

The plurality of signal registers 11, 21, 31, 41 stores the plurality of digital-chip samples from the analog-to-digital converter 61. In operation, a first gate 12, in response to a first set of phase signals, passes a first plurality of digital-chip samples into the first signal register 11. The first set of phases might occur, by way of example, during a first chip arriving at the receiver from a first path. The second gate 22, in response to a second set of phase signals, passes a second plurality of digital-chip samples into the second signal register 21. The second set of phases might coincide, by way of example, during the first chip arriving at the receiver from a second path. Similarly, the third gate 32, in response to a third set of phase signals, passes a third plurality of digital-chip samples into the third signal register 31. The third set of phases would coincide, by way of example, during the first chip arriving at the receiver from a third path. Also, the fourth gate 42, in response to a fourth set of phases, passes a fourth plurality of digital-chip samples into the fourth signal register 41. The fourth set of phase would occur, by way of example, with the first chip arriving at the receiver from a fourth path. Thus, the first signal register 11 stores the first plurality of digital-chip samples of the first chip arriving from a first path, the second signal register 21 stores the second plurality of digital-chip samples of the first chip arriving from a second path, the third signal register 31 stores the third plurality of digital-chip samples of the first chip arriving from the third path, and the fourth signal register 41 stores the fourth plurality of digital-chip samples of the first chip arriving from the fourth path. The processes of storing first, second, third and fourth sets of digital-chip samples would occur for a second chip, a third chip, a fourth chip, etc.

The process of storing digital-chip samples in the first signal register 11, the second signal register 21, the third signal register 31, and the fourth signal register 41, by way of example, is repeated until an entire chip-sequence signal, embedded in the spread-spectrum signal, is stored for each path. Thus, each signal register has sufficient capacity for storing an entire chip-sequence signal.

The signal-register multiplexer 53 selects a respective signal register from the plurality of signal registers 11, 21, 31, 41, in response to a register-select signal. For example, the signal-register multiplexer 53 would select the first signal register 11, and pass a first multiplicity of digital-chip samples to the matched filter 150. The first multiplicity of digital-chip samples includes the entire chip-sequence signal embedded in the spread-spectrum signal. Subsequently, the signal-register multiplexer 53 would successively select the second signal register 21, the third signal register 31 and the fourth signal register 41, and pass a second multiplicity of digital-chip samples, a third multiplicity of digital-chip samples and a fourth multiplicity of digital chip samples to the matched filter, respectively. The second multiplicity, the third multiplicity and the fourth multiplicity of digital-chip samples, each include the entire chip-sequence signal embedded in the spread-spectrum signal. Each of the first, second, third and fourth pluralities of digital-chip samples are separately processed by the matched filter 150. Each of the first, second, third and fourth multiplicity of digital-chip samples may include errors.

The matched filter 150 has an impulse response matched to the chip-sequence signal embedded in the spread-spectrum signal. The matched filter 150 detects an early portion, a punctual portion, and a late portion, of each chip embedded in the spread-spectrum signal for each path from the plurality of paths of the multipath, respectively.

The RAKE-timing generator 59 generates a plurality of path-select signals, which correspond to the plurality of paths from the multipath environment. The RAKE-timing generator 59 receives RAKE path and weights from a RAKE circuit 23. The RAKE circuit 23, which is coupled to matched filter 150, receives detected signals for each path of the multipath environment from matched filter 150.

In response to the plurality of path-select signals, the plurality of DLL path-tracking circuits 17, 27, 37, 47, gates the early portion and the late portion, corresponding to a respective path, of the detected spread-spectrum signal, into a particular DLL path-tracking circuit. The gating is in response to a respective path-select signal of the plurality of path-select signals. Assume, by way of example, the plurality of path-select signals includes a first path-select signal corresponding to the first path, a second path-select signal corresponding to the second path, a third path-select signal corresponding to the third path, and a fourth path-select signal corresponding to the fourth path. The first path-select signal triggers the first DLL path-tracking circuit 17 to track the detected spread-spectrum signal arriving from the first path of the multipath environment. The second path-select signal triggers the second DLL path-tracking circuit 27 to track the detected spread-spectrum signal arriving from the second path of the multipath environment. The third path-select signal triggers the third DLL path-tracking circuit 37 to track the detected spread-spectrum signal arriving from the third path of the multipath environment. The fourth path-select signal triggers the fourth DLL path-tracking circuit 47 to track the detected spread-spectrum signal arriving from the fourth path of the multipath environment. Each of the plurality of DLL path-tracking tracking circuits 17, 27, 37, 47 thereby generates a DLL signal of the plurality of DLL signals.

The plurality of DLL path-tracking circuits 17, 27, 37, 47 may operate from only the early portion or the late portion of the detected spread-spectrum signal. If only the late portion were used, then the early portion may be from the late portion of a previously detected bit of the spread-spectrum signal; conversely, if only the early portion were used, then the late portion may be from the early portion of a subsequently detected bit of the spread-spectrum signal.

The plurality of DLL multiplexers 18, 28, 38, 48 passes a respective set of phases of the plurality of phases from the clock-signal generator to a respective gate of the plurality of gates 12, 22, 32, 42, in response to a respective DLL signal from the respective DLL path-tracking circuit. A particular set of phases corresponds to a particular path being tracked by a particular DLL path-tracking circuit. The plurality of DLL multiplexers 18, 28, 38, 48 thereby generates a multiplicity of sets of phase signals, respectively.

Each DLL path-tracking circuit may include an early register 171, an early absolute value circuit 173, a late register 172, a late absolute value circuit 174, a subtraction circuit 175, an integrate-and-dump circuit 176, a sampling circuit 177, and a counter 178. The early absolute-value circuit 173 is coupled to the early register 171. The late absolute-value circuit 174 is coupled to the late register 172. The subtraction circuit is coupled to the early absolute-value circuit 173 and the late absolute-value circuit 174. The counter 178 is coupled through the integrate-and-dump circuit 176 and the sampling circuit 177, to the subtraction circuit 175.

The early register 171 stores the early portion. The early absolute-value circuit 173 generates an early-absolute value from the early portion. The late register 172 stores the late portion. The late absolute-value circuit 174 generates a late-absolute value from the late portion. The subtraction circuit 175 generates a difference signal from the early-absolute value and the late-absolute value. The functions of the integrate-and-dump circuit 176 and the sampling circuit 177 integrate-and-dump, and then sample, the difference signal. The counter 178 generates a respective DLL signal, in response to the difference signal from the subtraction circuit 175.

The matched filter 150 may include a reference register 55, a filter multiplexer 56, and an adder tree 57. The filter multiplexer 56 is coupled through the enable circuit 54, to the register multiplexer 53 and to the reference register 55. The adder tree 57 is coupled to the filter multiplexer 56.

The reference register 55 stores a replica of the chip-sequence signal, which was used in the spread-spectrum signal. The filter multiplexer 56 multiplies the replica of the chip-sequence signal by an output selected by the register multiplexer 53. This multiplication generates a plurality of multiplier-output signals.

The adder tree 57 combines the plurality of multiplier-output signals from the filter multiplexer 56, to generate the early portion, the punctual portion, and the late portion of the spread-spectrum signal, for each path of the plurality of paths.

The present invention may further include a plurality of Costas loops 19, 29, 39, 49 and a maximal-ratio combiner 69. The plurality of Costas loops 19, 29, 39, 49 are coupled to the matched filter 150 and to the RAKE-timing generator 59, and the maximal-ratio combiner 69 is coupled to the plurality of Costas loops 19, 29, 39, 49.

The plurality of Costas loops 19, 29, 39, 49 generates a plurality of detection signals. Each Costas loop of the plurality of Costas loops 19, 29, 39, 49, in response to a respective path-select signal from the RAKE-timing generator 59, and to the punctual portion of the spread-spectrum signal of each path of the plurality of paths, generates a detection signal. The maximal-ratio combiner 69 combines the plurality of detection signals.

The present invention also includes a method for receiving, from a multipath environment, a spread-spectrum signal having multipath. The spread-spectrum signal has data spread by a chip-sequence signal. Each chip of the chip-sequence signal has a chip duration, with a spread-spectrum signal arriving from a plurality of paths from the multipath environment.

The method comprises the steps of generating a clock signal, with a clock signal, during a chip duration, having a plurality of phases. The number of phases of the plurality of phases in the clock signal is at least equal to the number of paths of the plurality of paths from the multipath environment. The steps further include sampling the spread-spectrum signal to generate, during the chip duration, a plurality of chip samples. A number of chip samples in the plurality of chip samples is at least equal to the number of phases of a plurality of phases in the clock signal.

The method further includes, in response to each chip sample of the plurality of chip samples, converting each chip sample to a digital-chip sample. A plurality of digital-chip samples are stored in a plurality of signal registers. The method further includes passing, through a plurality of gates, a respective number of the plurality of digital-chip samples into a respective signal register of the plurality of signal registers.

The method further includes selecting a respective signal register from the plurality of signal registers, and detecting an early portion, a punctual portion and a late portion of each chip embedded in the spread-spectrum signal, for each path of the plurality of paths, respectively. The method includes generating a plurality of path-select signals corresponding to the plurality of paths from the multipath environment, gating the early portion and the late portion, corresponding to a respective path of the detected spread-spectrum signal, into the DLL path-select tracking circuit, and generating a DLL signal of the plurality of DLL signals. The method additionally includes passing, in response to a respective DLL signal from a respective DLL path tracking circuit, a respective set of phases of the plurality of phases to a respective gate of the plurality of gates.

It will be apparent to those skilled in the art that various modifications can be made to the multi-clock matched filter for receiving signals with multipath of the instant invention without departing from the scope or spirit of the invention, and it is intended that the present invention cover modifications and variations of the multi-clock matched filter for receiving signals with multipath provided they come within the scope of the appended claims and their equivalents.

We claim:

1. An improvement, to a spread-spectrum receiver, for receiving, in a multipath environment, a spread-spectrum signal having data spread by a chip-sequence signal, with each chip of the chip-sequence signal having a chip duration, with the spread-spectrum signal arriving from a plurality of paths from the multipath environment, comprising:

a clock-signal generator for generating a clock signal, with the clock signal, during a chip duration, having a plurality of phases, with a number of phases of the plurality of phases at least equal to a number of paths of the plurality of paths;

an analog-to-digital converter for sampling the spread-spectrum signal to generate, during the chip duration, a plurality of chip samples, with a number of chip samples in the plurality of chip samples at least equal to the number of phases in the plurality of phases, said analog-to-digital converter, responsive to each chip sample of the plurality of chip samples, for converting each chip sample to a digital-chip sample, thereby generating a plurality of digital-chip samples;

a plurality of signal registers, coupled to said analog-to-digital converter, for storing the plurality of digital-chip samples;

a plurality of gates, coupled between said plurality of signal registers, respectively, and said analog-to-digital converter, each of said plurality of gates responsive to a set of phase signals, respectively, from a multiplicity of sets of phase signals, for passing a respective number of the plurality of digital-chip samples into a respective signal register of the plurality of signal registers;

a signal-register multiplexer, coupled to each of the plurality of signal registers, said signal-register multiplexer responsive to a register-select signal, for selecting a respective signal register from the plurality of signal registers;

a matched filter, coupled to said signal-register multiplexer, and having an impulse response matched to the spread-spectrum signal, for detecting an early portion, a punctual portion and a late portion of each chip embedded in the spread-spectrum signal for each path of the plurality of paths, respectively;

a RAKE-timing generator for generating a plurality of path-select signals corresponding to the plurality of paths from the multipath environment;

a plurality of delay-locked-loop (DLL) path-tracking circuits, with each DLL path-tracking circuit responsive to a respective path-select signal of the plurality of path-select signals, for gating the early portion and the late portion, corresponding to a respective path, of a detected spread-spectrum signal, into the respective DLL path-tracking circuit, and for generating a DLL signal of a plurality of DLL signals; and a plurality of DLL multiplexers coupled to said clock-signal generator, to said plurality of DLL path-tracking circuits, and to said plurality of gates, respectively, each DLL multiplexer of said plurality of DLL multiplexers, responsive to a respective DLL signal from a respective DLL path-tracking circuit, for passing a respective set of phases of the plurality of phases from said clock-signal generator to a respective gate of said plurality of gates, with said plurality of DLL multiplexers thereby generating a multiplicity of sets of phase signals, respectively.

2. The improvement as set forth in claim 1, with each DLL path-tracking circuit including:

an early register for storing the early portion;

an early absolute-value circuit, coupled to said early register, for generating an early-absolute value from the early portion;

a late register for storing the late portion;

a late absolute-value circuit, coupled to said late register, for generating a late-absolute value from the late portion;

a subtraction circuit, coupled to said early absolute-value circuit and to said late absolute-value circuit, for generating a difference signal from the early-absolute value and the late-absolute value; and a counter, coupled to said subtraction circuit, for generating, responsive to the difference signal, the respective DLL signal.

3. The improvement as set forth in claim 1 or 2, with the matched filter including:

a reference register for storing a replica of the chip-sequence signal of the spread-spectrum signal;

a filter multiplexer, coupled to said signal-register multiplexer and to said reference register, for multiplying the replica of the chip-sequence signal by an output selected by said signal-register multiplexer, thereby generating a plurality of multiplier-output signals; and an adder tree, coupled to said filter multiplexer, for combining the plurality of multiplier-output signals from said filter multiplexer, thereby generating the early portion, the punctual portion and the late portion of the spread-spectrum signal for each path of the plurality of paths, respectively.

4. The improvement as set forth in claim 1 or 2, further including:

a plurality of Costas loops, coupled to said matched filter and to said RAKE-timing generator, for generating a plurality of detection signals, each Costas loop of the plurality of Costas loops responsive to a respective path-select signal from said RAKE-timing generator, and to the punctual portion of the spread-spectrum signal of each path of the plurality of paths, for generating a detection signal; and a maximal-ratio combiner coupled to the plurality of Costas loops, for maximal ratio combining the plurality of detection signals.

5. An improvement, to a spread-spectrum receiver, for receiving, in a multipath environment, a spread-spectrum signal having data spread by a chip-sequence signal, with each chip of the chip-sequence signal having a chip duration, with the spread-spectrum signal arriving from a plurality of paths from the multipath environment, comprising:

clock-signal means for generating a clock signal, with the clock signal, during a chip duration, having a plurality of phases, with a number of phases of the plurality of phases at least equal to a number of paths of the plurality of paths;

converter means for sampling the spread-spectrum signal to generate, during the chip duration, a plurality of chip samples, with a number of chip samples in the plurality of chip samples at least equal to the number of phases in the plurality of phases, said converter means, responsive to each chip sample of the plurality of chip samples, for converting each chip sample to a digital-chip sample;

register means for storing a plurality of digital-chip samples;

gate means coupled between said register means and said converter means, said gate means responsive to a set of phase signals from a multiplicity of sets of phase signals, for passing a respective number of the plurality of digital-chip samples into a respective signal register of the register means;

signal-multiplexer means coupled to said register means, said signal-multiplexer means responsive to a register-select signal, for selecting a respective signal register from said register means;

matched-filter means, coupled to said signal-multiplexer means and having an impulse response matched to the spread-spectrum signal, for detecting an early portion, a punctual portion and a late portion of each chip embedded in the spread-spectrum signal for each path of the plurality of paths, respectively;

RAKE generator means for generating a plurality of path-select signals corresponding to the plurality of paths from the multipath environment;

delay-locked-loop (DLL) means, responsive to a respective path-select signal from the plurality of path-select signals, for gating the early portion and the late portion, corresponding to a respective path, of a detected spread-spectrum signal, into the DLL means, and for generating a DLL signal of a plurality of DLL signals; and DLL multiplexer means, coupled to said clock-signal means, to said DLL means, and to said gate means, and responsive to a respective DLL signal from said DLL means, for passing a respective set of phases of the plurality of sets of phases from said clock-signal means to said gate means, with said DLL multiplexer means thereby generating a multiplicity of sets of phase signals, respectively.

6. The improvement as set forth in claim 5, with said DLL means comprising a plurality of DLL multiplexers, each DLL multiplexer including:

an early register for storing the early portion;

an early absolute-value circuit, coupled to said early register, for generating an early-absolute value from the early portion;

a late register for storing the late portion;

a late absolute-value circuit, coupled to said late register, for generating a late-absolute value from the late portion;

a subtraction circuit, coupled to said early absolute-value circuit and to said late absolute-value circuit, for generating a difference signal from the early-absolute value and the late-absolute value; and a counter, coupled to said subtraction circuit, for generating, responsive to the difference signal, the respective DLL signal.

7. The improvement as set forth in claim 5 or 6, with said matched-filter means including:

a reference register for storing a replica of the chip-sequence signal of the spread-spectrum signal;

a filter multiplexer, coupled to said signal-multiplexer means and to said reference register, for multiplying the replica of the chip-sequence signal by an output selected by said signal-multiplexer means, thereby generating a plurality of multiplier-output signals; and an adder tree, coupled to said filter multiplexer, for combining the plurality of multiplier output signals from said filter multiplexer, thereby generating the early portion, punctual portion and late portion of the spread-spectrum signal for each path of the plurality of paths, respectively.

8. The improvement as set forth in claim 5 or 6, further including:

a plurality of Costas loops coupled to said matched filter means and to said RAKE generator means, for generating a plurality of detection signals, each Costas loop of the plurality of Costas loops responsive to a respective path-select signal from said RAKE generator means, and to the punctual portion of the spread-spectrum signal of each path of the plurality of paths, for generating a detection signal; and a maximal-ratio combiner coupled to the plurality of Costas loops, for maximal ratio combining the plurality of detection signals.

9. A method for improving a spread-spectrum receiver for receiving, from a multipath environment, a spread-spectrum signal having data spread by a chip-sequence signal, with each chip of the chip-sequence signal having a chip duration, with the spread-spectrum signal arriving from a plurality of paths from the multipath environment, comprising the steps of:

generating a clock signal, with the clock signal, during a chip duration, having a plurality of phases, with a number of phases of the plurality of phases at least equal to a number of paths of the plurality of paths;

sampling the spread-spectrum signal to generate, during the chip duration, a plurality of chip samples, with a number of chip samples in the plurality of chip samples at least equal to the number of phases in the plurality of phases;

converting, in response to each chip sample of the plurality of chip samples, each chip sample to a digital-chip sample;

storing a plurality of digital-chip samples in a plurality of signal registers;

passing, through a plurality of gates, a respective number of the plurality of digital-chip samples into a respective signal register of the plurality of signal registers;

selecting a respective signal register from the plurality of signal registers;

detecting an early portion, a punctual portion and a late portion of each chip embedded in the spread-spectrum signal for each path of the plurality of paths, respectively;

generating a plurality of path-select signals corresponding to the plurality of paths from the multipath environment;

gating the early portion and the late portion, corresponding to a respective path, of the detected spread-spectrum signal, for generating a DLL signal of a plurality of DLL signals; and passing, in response to a respective DLL signal, a respective set of phases of the plurality of phases to a respective gate of said plurality of gates.

10. The improvement as set forth in claim 9, with the step of gating the early portion and the late portion including the steps of:

storing the early portion;

generating an early-absolute value from the early portion;

storing the late portion;

generating a late-absolute value from the late portion;

generating a difference signal from the early-absolute value and the late-absolute value; and generating, in response to the difference signal, the respective DLL signal.

11. The improvement as set forth in claim 9 or 10, with the step of detecting the early portion, the punctual portion and the late portion, including the steps of:

storing a replica of the chip-sequence signal of the spread-spectrum signal;

multiplying the replica of the chip-sequence signal by an output of the step of selecting a respective signal register, thereby generating a plurality of multiplier-output signals; and combining the plurality of multiplier-output signals, thereby generating the early portion, the punctual portion and the late portion of the spread-spectrum signal for each path of the plurality of paths, respectively.

12. The improvement as set forth in claim 9 or 10, further including the steps of:

generating a plurality of detection signals in response to a respective path-select signal and to the punctual portion of the spread-spectrum signal of each path of the plurality of paths; and maximal-ratio combining the plurality of detection signals.

* * * * *